Dec. 8, 1964 TAKAO TERASAWA 3,160,229
COMPRESSORS
Filed March 20, 1962

INVENTOR:
TAKAO TERASAWA
BY:
McGlew and Toren
ATTORNEYS

United States Patent Office 3,160,229
Patented Dec. 8, 1964

3,160,229
COMPRESSORS
Takao Terasawa, Numazu-shi, Japan, assignor to Tokyo Shibaura Denki Kabushiki Kaisha, Kawasaki-shi, Japan, a joint-stock company of Japan
Filed Mar. 20, 1962, Ser. No. 181,077
4 Claims. (Cl. 184—6)

This invention relates to compressors, more particularly to compressors suitable for use with so-called car coolers and constructed to assure adequate supply of lubricant oil contained in the compressor casing to various moving parts of the compressors regardless of whether the compressors are installed in vertical position or horizontal position.

In installing a compressor in a motor vehicle, the suitable position for its installation becomes a problem because the space inside a motor vehicle is limited. Thus, as the dimensions, that is, height, width, etc., of these compressors are different from type to type, where the space available is limited, it is often required to install compressors in a horizontal position instead of their normal vertical position. However, when installing compressors in a horizontal position as mentioned above, there arises the problem of supplying lubricant oil. Generally, compressors of the type mentioned have pump means unitarily constructed with their rotary portions to supply lubricant oil to various moving parts of the compressor. Accordingly, inlet ports communicating with the pumping means are required to be always immersed in the lubricant oil contained in the compressor casing. On the other hand, it is necessary to maintain the oil level in the compressor casing as low as possible in order to effectively utilize the lubricant oil. Even when a compressor is constructed so as to cause its lubricant inlet port to open beneath the oil level when the compressor is installed in its normal vertical position or in a horizontal position on one side, the inlet port becomes open in the gas space above the oil level when the compressor is installed in the opposite horizontal position, whereby supply of lubricant oil becomes impossible.

While this difficulty may be overcome by utilizing a greater quantity of lubricant oil or by interchanging certain parts depending upon the direction along which the compressor is installed, increase of oil quantity is, of course, not economical, and interchanging parts is troublesome.

Accordingly one object of this invention is to supply, by simple construction, lubricant oil to the required parts irrespective of the position of installation of the compressor.

Another object of this invention is to assure, by merely changing the mounting position of a pump cover, adequate supply of lubricant oil to various moving parts of the compressor irrespective of the position of installing the compressor.

Still another object of this invention is to assure, by slight machining of the compressor body, adequate supply of lubricant oil to the desired portions irrespective of the position of installing the compressor.

Other objects and advantages will become apparent from the following description when taken in connection with the accompanying drawing, in which.

Figure 1:
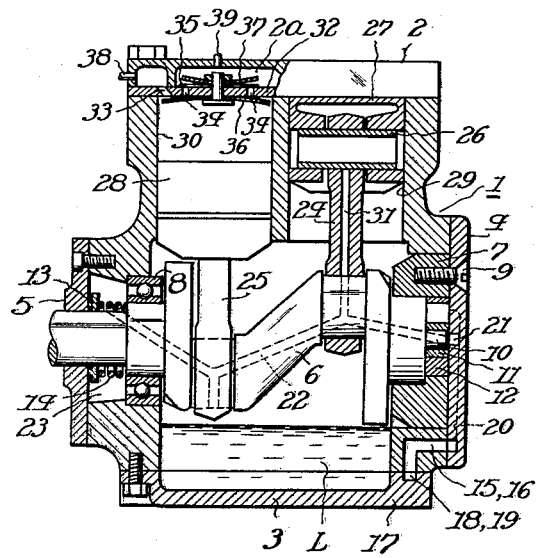
FIG. 1 is a side view, in longitudinal section, of a compressor embodying this invention.

Briefly stated, this invention can be practiced by providing a gear pump at one end of a crankshaft which is mounted in the compressor casing and connected with one or more pistons. A pair of mutually spaced oil ducts is provided on the two sides of the lower portion of the casing adjacent said pump, and one end of each duct is opened to the lubricant oil contained in the bottom portion of said casing when the compressor is installed in a predetermined orientation while the other end thereof is adapted to be selectively connected with one end of an oil groove machined in the inner surface of the cover of said pump. The other end of said oil groove is normally maintained in communication with the intake port of said pump so that, when the pump is operated, it draws the lubricant oil into the oil conduit provided through said crankshaft via said oil duct and groove to bearings at the opposite ends of said crankshaft or piston pins and the like. By changing the mounting position of said pump cover, communication between one of said oil ducts and said oil groove is interrupted by said cover while that between the other of said oil ducts and said oil groove is established. Thus the lubricant oil is supplied through said newly communicated oil duct and oil groove to the pump.

When the compressor is laid on its side in one horizontal direction, the mounting position of the pump cover is changed in such manner as to close by said cover the end of the oil duct which has been brought to the upper side in this position and to cause the other oil duct which has been brought to the lower side to communicate with said oil groove.

On the other hand, when the compressor is laid on its side in the opposite direction, the mounting position of the pump cover is displaced by 90 degrees from the previous position. In this manner, according to this invention, adequate supply of oil is always assured by simple means regardless of the mounting orientation of the compressor.

Referring now to the accompanying drawing illustrating a preferred embodiment of this invention, the casing 1 of a compressor, adapted to be mounted in a motor vehicle, for example, has an upper lid 2 having suitable valve devices 2a (only one being shown), a bottom cover 3, a pump cover 4 on one side, and a sealing cover 5 on the opposite side.

Horizontally supported in the casing is a crankshaft 6 with one end journalled in a plain bearing 7, and the opposite end of a ball bearing 8. As more clearly shown by FIGS. 2 and 3, the pump cover 4 is secured to the plain bearing by means of a plurality of screws 9. At the right end of the crankshaft 6, as viewed in FIG. 1, there is provided a reduced diameter section 10 to which is secured a cycloid pump member 11 contained in an eccentric cylinder 12 of a so-called cycloid pump.

While a cycloid pump is illustrated by way of example it will be clear that this invention is not to be limited to the cycloid pump, but a pump of any suitable type can be used.

The left end of the crankshaft extends through the sealing cover 5 to be driven by a source of motive power such as a motor vehicle engine, not shown. In the space between the sealing cover 5 and the ball bearing 8 is interposed a sealing ring 13 which is biassed against the sealing cover by means of a spring 14 to prevent leakage of the lubricating oil through the gap between the crankshaft and the sealing cover.

Figure 2:
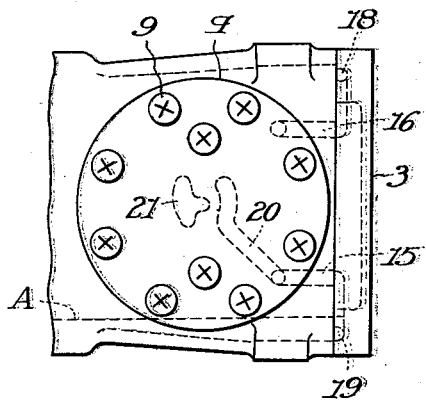
FIG. 2 is an end view of the compressor when it is laid on its side in one direction.
Figure 3:
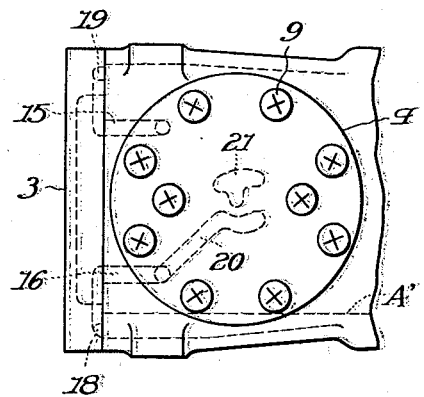
FIG. 3 is a similar view of the compressor when it is laid on its side in the opposite direction.

As shown in FIGS. 2 and 3, a pair of spaced oil ducts 15 and 16 is provided on the two sides of the lower portion of the casing adjacent to the pump. Also, a pair of oil ducts 18 and 19, each communicating at one end with the corresponding said oil conduit 15 or 16 and opening at its other end to the lubricant oil contained in the bottom of the casing is provided in the upper edge 17 of the bottom cover 3.

On the inner surface of said pump cover 4 is provided an oil groove 20 with one end thereof normally communicated with the intake port of said pump, while the other end is selectively connected with either one of said oil ducts 15 and 16 as will be more fully described later. Also on the inner surface of said pump cover is formed an exit oil groove 21 which is communicated with the exit port (not shown) of the pump to supply pressurized lubricant oil into an oil conduit 22 extending through the crankshaft. The opposite end of this oil conduit opens into a space 23 defined by the casing, the ball bearing 8 and the sealing cover 5. Pistons 27 and 28, arranged to reciprocate in cylinders 29 and 30, respectively, are connected to the crankshaft through connecting rods 24 and 25 and piston pins 26 (only one being shown).

When the compressor is driven, it compresses the gaseous refrigerant of the car cooling system. Since such a car cooling system is well known in the art and forms no part of this invention, description regarding thereto is deemed unnecessary.

Each of said connecting rods 24 and 25 has an oil conduit 31 therein to supply lubricant to the respective piston from the oil conduit 22 in the crankshaft 6.

The upper wall 32 of the cylinders has suction ports 33 and discharge ports 34. A discharge valve 35 covering the discharge ports 34 is secured to the upper surface of the upper wall, and a suction valve 36 is secured to the lower surface of the upper wall, the discharge valve 35 being restrained by a restraining plate 37. It will be understood that the suction port 33 is adapted to be connected with an evaporator, not shown, through a pipe line 38 connected to the upper lid 2, and that the discharge ports 34 are to be connected with a condenser, also not shown, through an outlet pipe line 39 connected to the upper lid. As is well known in the art the evaporator and the condenser are connected by a capillary tube to complete the refrigerating system.

Thus, when the piston descends, the gaseous refrigerant is drawn into the cylinder through the suction pipe 38 and the suction port 33, and when the piston ascends, the compressed refrigerant is expelled through the discharge ports 34, discharge valve 35, and the outlet pipe line 39.

For mounting the compressor in vertical position as shown in FIG. 1, the pump cover 4 is attached to the compressor casing in the relative position shown in FIG. 2 so as to cause the inlet oil groove 20 to communicate with the oil duct 15 and to close the end of the oil duct 16 by the inner surface of the pump cover 4.

Thus, when the compressor is driven to operate the pump through the crankshaft, the lubricant oil L is introduced into the oil conduit 22 through the oil conduits 19 and 15, inlet oil groove 20, the oil pump, and exit oil groove 21 and thence supplied to the ball bearing 8 and to the respective pistons through the oil conduit 31 in the connecting rod.

It is often required to install the compressor in horizontal orientation due to small height of the space in the motor vehicle in which the compressor is to be installed. If the space available is such that it is necessary to lay the compressor as shown in FIG. 2, and if it is assumed that the pump cover is fixed in the relative position shown, then the oil level will be changed to that indicated by a dotted line A. In such a case, also the oil duct 19 opens below the oil level so that adequate supply of the lubricant can be assured.

On the other hand, when the compressor is laid on its side in the opposite direction or in the direction shown in FIG. 3, oil ducts 15 and 19 are brought to the top side, and oil ducts 16 and 18 to the bottom side, and the oil level is changed to that shown by a dotted line A'. Thus, the duct 18 opens below the oil level. For such an installation, the position of securing the pump cover 4 is changed by 90 degrees from the position shown in FIG. 2 to that of FIG. 3. Thus, by such change the oil groove 20 is brought into communication with oil ducts 16 and 18, and the end of the oil duct 15 is closed by the inner face of the pump cover, whereby the lubricant can be supplied through oil ducts 16 and 18, the intake oil groove 20, and the pump.

Thus, the invention provides a novel compressor which can be installed in various angular positions by mere change of mounting position of its pump cover. In addition, the compressor requires no parts to be interchanged for changing its angular position of installation. Thus the compressor is particularly suitable for use in car cooling systems.

While the invention has been described by describing a particular embodiment thereof, it will be obvious that this invention is not limited thereto, and that various modifications may be made without departing from the true spirit and scope thereof as defined by the appended claims.

What is claimed is:

1. In a device including a casing having an interior defining a sump portion for a liquid such as a lubricant, a crankshaft having an oil passage defined thereon rotatably mounted in said casing, the disposition of the sump portion and the level of the liquid in said sump portion being variable in accordance with the orientation of the casing, the improvement comprising: wall means defining a casing capable of holding a liquid such as a lubricant, a plurality of liquid flow passages in said casing each terminating at its one end in a suction opening and at its opposite end at spaced locations within said casing, said suction openings being located at spaced locations for taking suction in the sump portion in accordance with the orientation of the casing, a pump for discharging liquid from said sump mounted on said casing including an inlet port and a discharge port connected to discharge into said crankshaft oil passage and a cover adapted to close one end of said sump including a connecting passage defined therein adapted to selectively interconnect said inlet port with one of said liquid flow passages for supplying liquid from said sump portion to said pump, and means for securing said cover to said pump permitting orientation of said cover for the purposes of selectively aligning said connecting passage alternatively with each said liquid flow passages.

2. In a device according to claim 1, wherein said crankshaft is rotatably supported within said casing, said pump being mounted on said casing adjacent an end of said crankshaft, said pump including an eccentric cylinder and a cycloid pumping member secured to said crankshaft and rotatable within said eccentric cylinder.

3. A compressor comprising: a casing, a crankshaft having an oil passage rotatable within said casing, said casing including a cylinder portion, a piston connected to said crankshaft and reciprocatable within said cylinder portion, means rotatably supporting said crankshaft including a pump housing having an opening at one end for rotatably receiving an end of said crankshaft, said pump including an eccentric cylinder, a cycloid member mounted on said crankshaft and rotatable in said eccentric cylinder for pumping liquid, said compressor casing including a plurality of liquid flow passages each terminating at their one end in a suction opening, the suction openings being spaced apart for taking suction in said casing at widely spaced locations in accordance with the orientation of said casing, said pump including an inlet port and a discharge port arranged to discharge into said crankshaft oil passage and a cover member secured to said casing to close the exterior end of said pump, said cover member having a passage to be selectively oriented with one of said liquid flow passages at one end and with said inlet port at an opposite end for connecting said inlet port to said liquid flow passages, and means holding said cover to said casing permitting selective positioning of said cover for connecting a selected one of said flow passages to said pump inlet port.

4. In a device including a casing having an interior defining a sump portion for a liquid such as a lubricant, with the disposition of the sump portion and the level of the liquid being variable in accordance with the orientation of the casing, the improvement comprising: casing wall means, a plurality of liquid flow passages in said casing wall means each terminating at their one ends in a suction opening, said suction openings being located at spaced locations for taking suction within said casing wall means in accordance with the orientation thereof, a pump mounted on said casing including an inlet port, a cover adapted to close one end of said pump including a connecting passage defined therein adapted to selectively interconnect said inlet port with one of said liquid flow passages for supplying liquid from said sump portion to said pump, means for securing said cover to said pump permitting orientation of said cover for the purposes of selectively aligning said connecting passage alternatively with each said liquid flow passage, and a crankshaft rotatably supported within said casing, said pump being mounted on said casing adjacent an end of said crankshaft, said pump including an eccentric cylinder and a cycloid pumping member secured to said crankshaft and rotatable within said eccentric, said crankshaft having a lubricating passage defined therethrough, said pump including a discharge port, said cover having a discharge connecting passage for connecting said pump discharge and the lubricating passage in said crankshaft.

References Cited in the file of this patent
UNITED STATES PATENTS

| | | |
|---|---|---|
| 1,995,438 | Sheats | Mar. 26, 1935 |
| 2,975,864 | Stoffert | Mar. 21, 1961 |